US012232000B2

(12) United States Patent
Neyama et al.

(10) Patent No.: US 12,232,000 B2
(45) Date of Patent: Feb. 18, 2025

(54) APPARATUS AND METHOD FOR COLLECTING DATA FOR MAP GENERATION, AND VEHICLE

(71) Applicant: TOYOTA JIDOSHA KABUSHIKI KAISHA, Toyota (JP)

(72) Inventors: Ryo Neyama, Tokyo (JP); Masahiro Tanaka, Tokyo (JP); Jun Koreishi, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 17/159,622

(22) Filed: Jan. 27, 2021

(65) Prior Publication Data

US 2021/0231457 A1   Jul. 29, 2021

(30) Foreign Application Priority Data

Jan. 29, 2020 (JP) ................................. 2020-012684

(51) Int. Cl.
*H04W 4/44* (2018.01)
*G01C 21/00* (2006.01)
*G06V 10/764* (2022.01)
*G06V 20/56* (2022.01)
*H04W 4/02* (2018.01)
*H04W 4/38* (2018.01)

(52) U.S. Cl.
CPC .......... *H04W 4/44* (2018.02); *G01C 21/3815* (2020.08); *G01C 21/3841* (2020.08); *G06V 10/764* (2022.01); *G06V 20/56* (2022.01); *H04W 4/025* (2013.01); *H04W 4/38* (2018.02)

(58) Field of Classification Search
CPC ........... G01C 21/3815; G01C 21/3841; G01C 21/3848; G01C 21/00; G06V 20/56; G06V 10/764; H04W 4/025; H04W 4/38; H04W 4/44; G06K 9/627; G08G 1/0969; G06F 18/2413
See application file for complete search history.

(56) References Cited

U.S. PATENT DOCUMENTS 9,760,090 B2    9/2017  Shashua et al.
2012/0121183 A1*  5/2012  Joshi ................ G08G 1/0104
                                                        382/191

(Continued)

FOREIGN PATENT DOCUMENTS

CN       109425358 A     3/2019
JP      2006-115360 A    4/2006

(Continued)

*Primary Examiner* — Faris S Almatrahi
*Assistant Examiner* — Dana F Artimez
(74) *Attorney, Agent, or Firm* — Sughrue Mion, PLLC

(57) ABSTRACT

An apparatus for collecting data for map generation includes a processor configured to determine whether the current state of a vehicle is suitable for collection of collection target data to be used for generating or updating a map, based on suitability data received from the vehicle with a communication device. The suitability data indicates suitability of the vehicle or surroundings thereof for the collection. The processor is also configured to instruct, with the communication device, the vehicle to collect the collection target data when determining that the current state of the vehicle is suitable for the collection.

8 Claims, 8 Drawing Sheets

(56) References Cited

U.S. PATENT DOCUMENTS

| | | | |
|---|---|---|---|
| 2017/0010105 A1* | 1/2017 | Gdalyahu | G01C 21/3691 |
| 2017/0010618 A1* | 1/2017 | Shashua | G06V 20/56 |
| 2017/0015317 A1* | 1/2017 | Fasola | B60W 30/12 |
| 2019/0063929 A1 | 2/2019 | Ohyama et al. | |
| 2019/0347489 A1 | 11/2019 | Kitaura et al. | |
| 2020/0074761 A1* | 3/2020 | Tsuyunashi | G07C 5/0841 |
| 2021/0180979 A1* | 6/2021 | Kitahara | G08G 1/0129 |
| 2021/0190512 A1* | 6/2021 | Choi | G01C 21/32 |

FOREIGN PATENT DOCUMENTS

| | | |
|---|---|---|
| JP | 2007-3568 A | 1/2007 |
| JP | 2008-039687 A | 2/2008 |
| JP | 2014-215205 A | 11/2014 |
| JP | 2019-105789 A | 6/2019 |
| JP | 2019-200495 A | 11/2019 |

\* cited by examiner

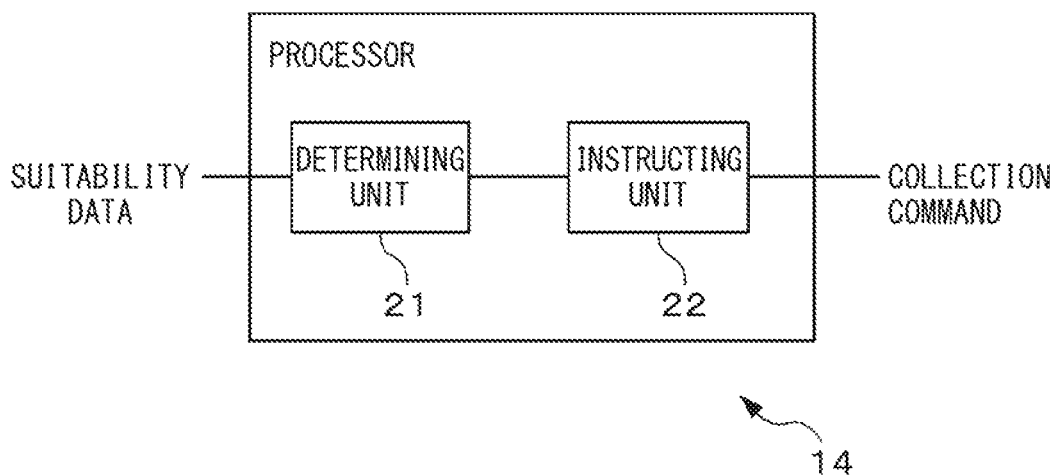
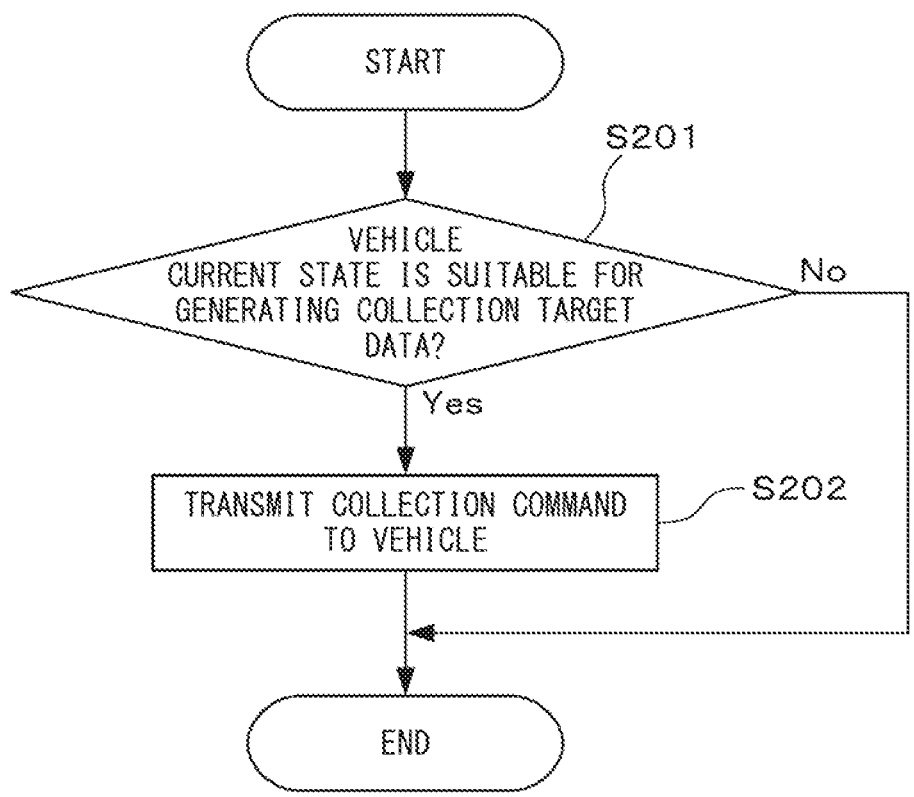

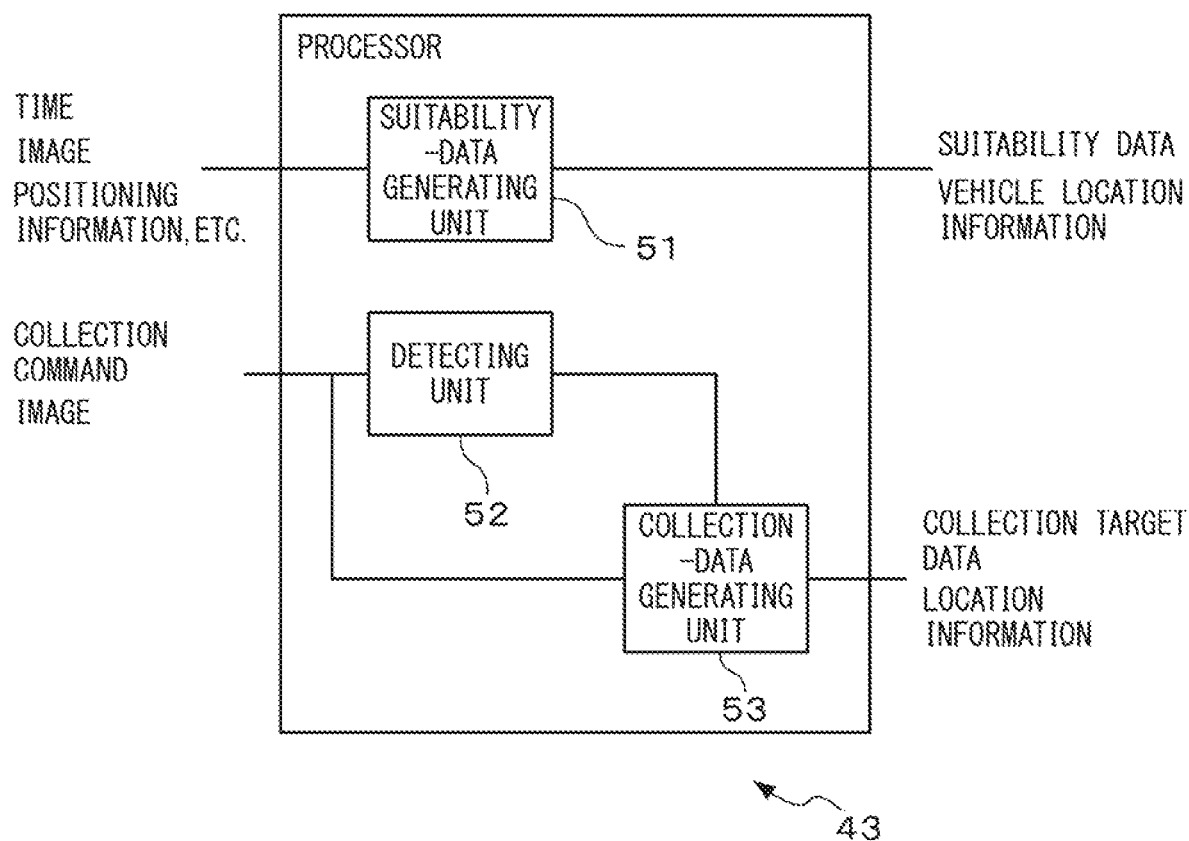

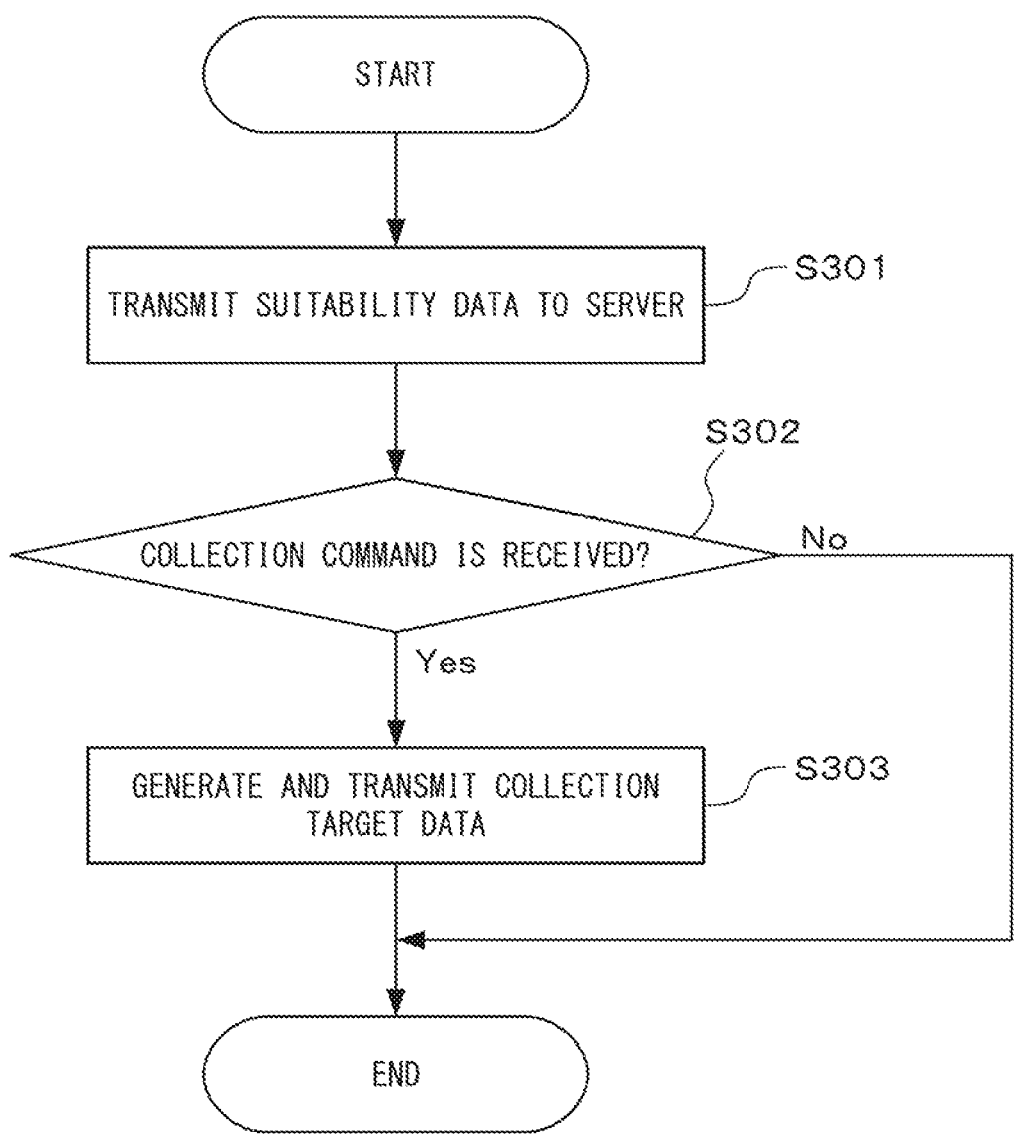

APPARATUS AND METHOD FOR
COLLECTING DATA FOR MAP
GENERATION, AND VEHICLE

FIELD

The present invention relates to an apparatus and a method for collecting data to be used for generating or updating a map, as well as to a vehicle.

BACKGROUND

Highly accurate road maps to which an automated vehicle-driving system refers for automated driving control of a vehicle are required to accurately represent road information. For this reason, techniques have been proposed to appropriately collect road information from multiple vehicles (e.g., see U.S. Pat. No. 9,760,090 and Japanese Unexamined Patent Publication No. 2014-215205).

For example, U.S. Pat. No. 9,760,090 discloses a technique in which a server receives navigation information from multiple vehicles, associates it with a common road segment, and generates at least a portion of an autonomous vehicle road navigation model for the common road segment, based on the navigation information. Japanese Unexamined Patent Publication No. 2014-215205 discloses a technique of a navigation device. This navigation device determines whether there is a difference between feature information that is included in map data and corresponds to a feature located on a movement path and feature information actually acquired during movement, and, if any, transmits the determination result and the feature information used in the determination to a server device. The navigation device updates the map data using update data only when the update data is transmitted thereto.

SUMMARY

In the above described techniques, transmission of a large amount of data from the vehicles to the server results in a vast amount of data stored in the server even if each transmitted piece of data is small in size. This will increase hardware cost (e.g., a server having a large amount of storage capacity will be required) and communication loads, and require a vast number of man-hours for classifying the data.

It is an object of the present invention to provide an apparatus for collecting data for map generation that stores a smaller amount of data for map generation and reduces the communication load of transmission of such data.

According to an embodiment, an apparatus for collecting data for map generation is provided. The apparatus includes a communication device capable of communicating with a vehicle, and a processor configured to determine whether the current state of the vehicle is suitable for collection of collection target data to be used for generating or updating a map, based on suitability data received from the vehicle with the communication device. The suitability data indicates suitability of the vehicle or surroundings thereof for the collection. The processor is also configured to instruct, with the communication device, the vehicle to collect the collection target data when determining that the current state of the vehicle is suitable for the collection.

The suitability data of the apparatus preferably includes at least one index selected from the group consisting of a visibility index indicating visibility of a road or a road feature represented in an image of the surroundings of the vehicle generated by a camera mounted on the vehicle, a hidden index indicating whether a feature near the vehicle is hidden in the image by another object, a rest index indicating whether the vehicle is at rest, and a location index indicating the location of the vehicle.

The suitability data may include the visibility index. In this case, preferably, only when the visibility index indicates that a road or a road feature is clear in the image, the processor determines that the current state of the vehicle is suitable for the collection.

Alternatively, the suitability data may include the hidden index. In this case, preferably, only when the hidden index indicates that a feature near the vehicle is not hidden in the image by another object, the processor determines that the current state of the vehicle is suitable for the collection.

Alternatively, the suitability data may include the rest index. In this case, preferably, only when the rest index indicates that the vehicle is moving, the processor determines that the current state of the vehicle is suitable for the collection.

Alternatively, the suitability data may include the location index. In this case, preferably, only when the location index indicates that the vehicle is not straddling a lane division line, the processor determines that the current state of the vehicle is suitable for the collection.

According to another embodiment of the present invention, a method for collecting data for map generation is provided. The method includes determining whether the current state of a vehicle is suitable for collection of collection target data to be used for generating or updating a map, based on suitability data received from the vehicle with a communication device. The suitability data indicates suitability of the vehicle or surroundings thereof for the collection. The method further includes instructing, with the communication device, the vehicle to collect the collection target data when determining that the current state of the vehicle is suitable for the collection.

According to still another embodiment of the present invention, a vehicle is provided that includes a communication device capable of communicating with an apparatus for collecting data for map generation. The vehicle includes a processor configured to generate suitability data indicating suitability of the vehicle or surroundings thereof for collection of collection target data to be used for generating or updating a map, and determine whether the current state of the vehicle is suitable for the collection, based on the suitability data. The processor is also configured to generate the collection target data and transmit the generated collection target data to the apparatus with the communication device when determining that the current state of the vehicle is suitable for the collection.

The apparatus according to the present invention has an advantageous effect of storing a smaller amount of data for map generation and reducing the communication load of transmission of such data.

BRIEF DESCRIPTION OF DRAWINGS

FIG. 4 is a functional block diagram of a processor of the server, related to the data collecting process.

FIG. 5 is an operation flowchart of the data collecting process performed by the server.

FIG. 8 is a functional block diagram of a processor of the data acquiring apparatus.

FIG. 9 is an operation flowchart of a process performed by the vehicle in the data collecting process.

DESCRIPTION OF EMBODIMENTS

Hereinafter, an apparatus for collecting data for map generation, a method therefor performed by the apparatus, and a vehicle used together with the apparatus will be described with reference to the accompanying drawings. The apparatus, which is referred to as the "data collecting apparatus" below, collects data to be used for generating or updating a map or a road map from a vehicle. This data, which is referred to as "collection target data" or "data for map generation" below, represents a feature near the vehicle. In collecting such data, the vehicle transmits suitability data to the data collecting apparatus before transmitting the collection target data thereto. The suitability data indicates suitability of the vehicle or surroundings thereof for data collection. The data collecting apparatus determines whether the current state of the vehicle is suitable for data collection, based on the received suitability data, and, when determining that the current state of the vehicle is suitable for data collection, instructs the vehicle to collect the collection target data. The vehicle having received such an instruction generates collection target data, using an image of the surroundings of the vehicle generated by a camera mounted on the vehicle, and transmits the generated collection target data to the data collecting apparatus. In this way, the data collecting apparatus determines beforehand whether collection target data suitable for map generation can be obtained, and, when such data is supposed to be obtained, instructs the vehicle to collect the collection target data, which prevents the vehicle from transmitting collection target data unsuitable for map generation to the apparatus. The data collecting apparatus thus stores a smaller amount of collection target data, reducing the hardware cost of the apparatus and the man-hours for classifying the collection target data as well as the communication load between the vehicle and the apparatus.

Figure 1:
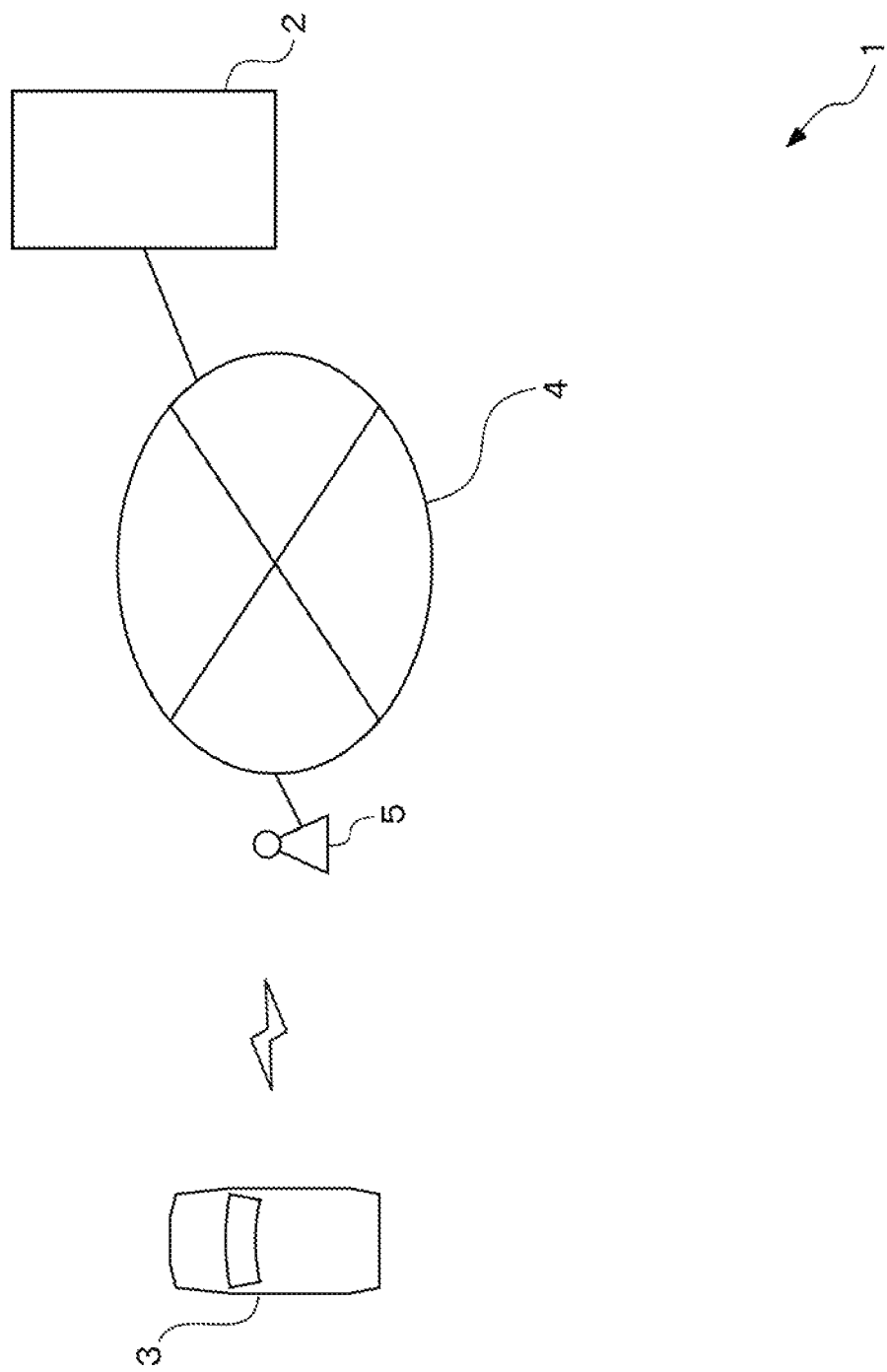
FIG. 1 schematically illustrates the configuration of a system for collecting data for map generation that includes an apparatus for collecting data for map generation.

FIG. 1 schematically illustrates the configuration of a system for collecting data for map generation that includes the data collecting apparatus. In the present embodiment, the system 1 includes a server 2, which is an example of the apparatus for collecting data for map generation, and at least one vehicle 3. The vehicle 3 accesses a wireless base station 5, which is connected, for example, via a gateway (not illustrated) to a communication network 4 connected with the server 2, thereby connecting to the server 2 via the wireless base station 5 and the communication network 4. Although FIG. 1 illustrates only one vehicle 3, the system I may include multiple vehicles 3. Similarly, the communication network 4 may be connected with multiple wireless base stations 5.

Figure 2:
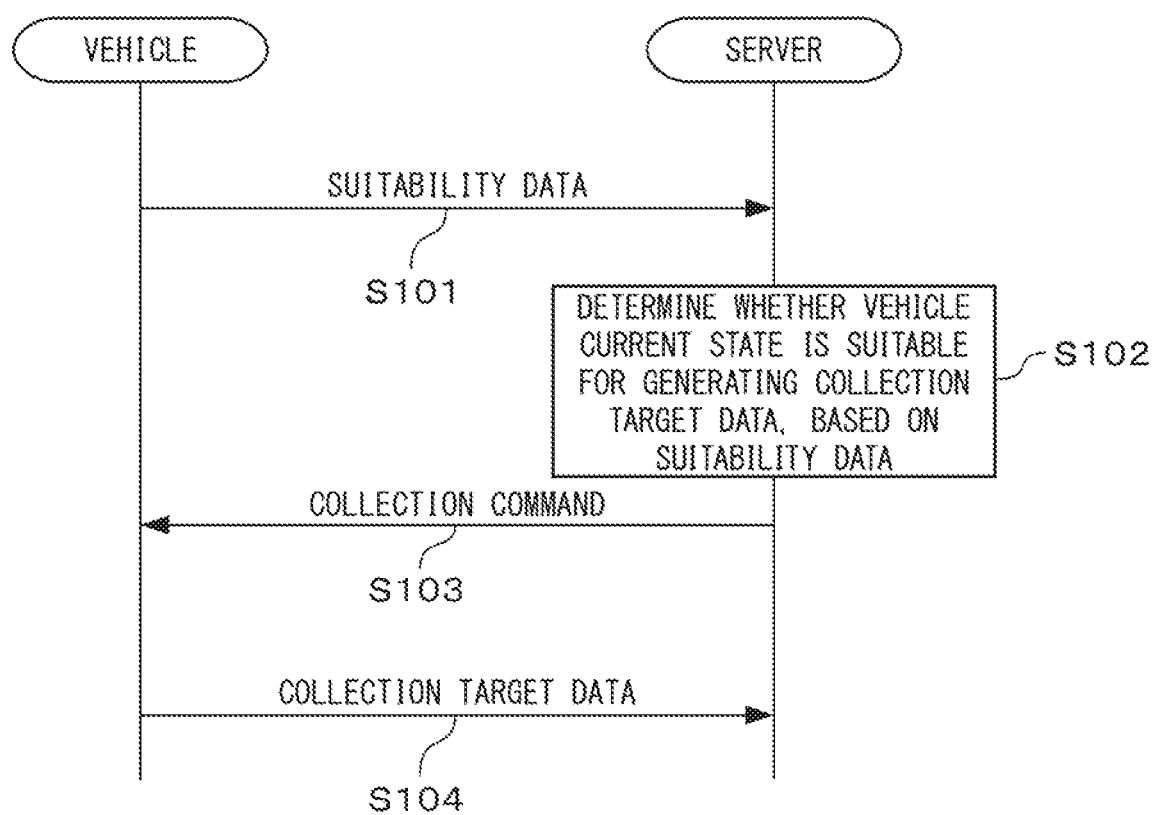
FIG. 2 illustrates the sequence of a process for collecting data for map generation.

FIG. 2 illustrates the sequence of a process for collecting data for map generation, which is referred to as a "data collecting process" below. For example, every predetermined period, the system 1 may perform the data collecting process in accordance with the sequence illustrated in FIG. 2.

The vehicle 3 generates suitability data, which indicates suitability of the vehicle or surroundings thereof for data collection, and transmits the generated suitability data to the server 2 via the wireless base station 5 and the communication network 4 together with identification information of the vehicle 3 and vehicle location information indicating the location of the vehicle 3 (step S101). The suitability data includes, for example, a visibility index indicating visibility of a road or a road feature represented in an image generated by a camera mounted on the vehicle 3, a rest index indicating whether the vehicle 3 is at rest, a hidden index indicating whether a feature near the vehicle 3 is hidden in the image by another object (e.g., another vehicle near the vehicle 3), or a location index indicating the location of the vehicle 3. The visibility index includes, for example, the current time, control information on automatic lighting of the vehicle 3, a value sensed by a illuminance sensor mounted on the vehicle 3, information on stains of the vehicle-mounted camera, or an image visibility value (e.g., a value indicating the contrast or the luminance distribution of a road region) obtained by analyzing an image generated by the vehicle-mounted camera. The rest index includes, for example, the position of the shift lever of the vehicle 3 or the speed of the vehicle 3. The hidden index includes, for example, the setting value of the vehicle distance for the case that the vehicle 3 automatically cruises, or a measurement of the distance from the vehicle 3 to another object close thereto obtained by a range sensor mounted on the vehicle 3. The location index may include information indicating the absolute location of the vehicle 3, or information indicating the location of the vehicle 3 relative to a lane division line (e.g., a flag indicating whether the vehicle 3 is straddling the lane division line). The vehicle location information may include the traveling direction of the vehicle 3.

The server 2 determines whether the current state of the vehicle 3 is suitable for data collection, based on the received suitability data (step S102). For example, the server 2 determines that the current state of the vehicle 3 is suitable for data collection in the case that the following conditions are satisfied: a road or a road feature is clearly represented in the image; a feature near the vehicle 3 is not hidden in the image; the vehicle 3 is moving; and the vehicle 3 is at a location suitable for data collection. When determining that the current state of the vehicle 3 is suitable for data collection, the server 2 transmits a collection command, which is an instruction to collect the collection target data, to the vehicle 3 via the communication network 4 and the wireless base station 5 (step S103).

When receiving the collection command, the vehicle 3 generates collection target data of a type designated by the server 2, and transmits the generated collection target data to the server 2 via the wireless base station 5 and the communication network 4 together with location information indicating the location of a feature represented by the collection target data (step S104). Examples of the type of collection target data include an image that is generated by the camera mounted on the vehicle 3 and represents surroundings of the vehicle 3, a sub-image of a road surface cut out from the image, and feature information for identifying a feature represented in the image and on a map to be generated or updated. Every time receiving the collection command, the vehicle 3 may generate only one piece of collection target data and transmit it to the server 2. Alternatively, when receiving the collection command, the vehicle 3 may generate pieces of collection target data respectively from multiple images generated by the camera in a predetermined period before and after the reception, and transmit the generated collection target data collectively to the server 2.

The server 2 may transmit, to the vehicle 3 beforehand, type information for designating the type of collection target data for a target region for collecting the collection target data and each road section included in the region. In this case, for example, the server 2 may transmit the type information to the vehicle 3 when the location of the vehicle 3 indicated by the vehicle location information received from the vehicle 3 is included in the target region. The vehicle 3 may perform processes related to generation and transmission of the suitability data and the collection target data when its location is included in the target region.

Figure 3:
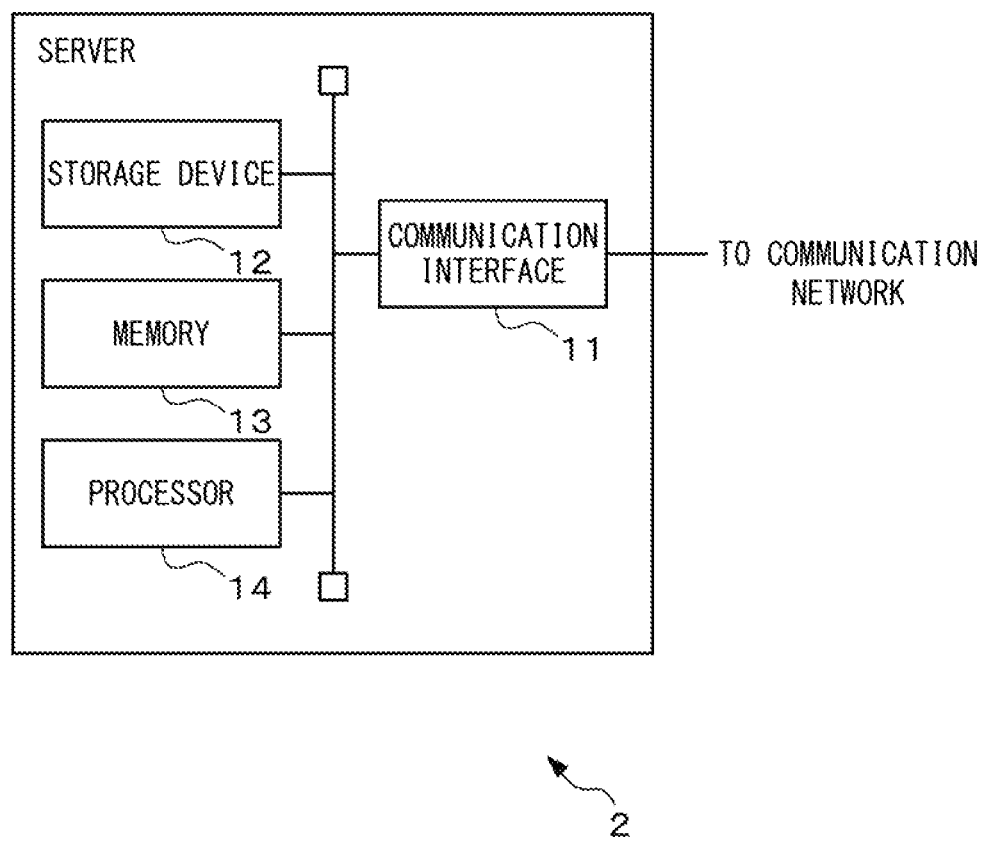
FIG. 3 illustrates the hardware configuration of a server, which is an embodiment of the data collecting apparatus.

FIG. 3 illustrates the hardware configuration of the server 2, which is an example of the apparatus for collecting data for map generation. The server 2 includes a communication interface 11, a storage device 12, a memory 13, and a processor 14. The communication interface 11, the storage device 12, and the memory 13 are connected to the processor 14 via a signal line. The server 2 may further include an input device, such as a keyboard and a mouse, and a display device, such as a liquid crystal display.

The communication interface 11, which is an example of the communication unit, includes an interface circuit for connecting the server 2 to the communication network 4. The communication interface 11 is configured so that it can communicate with the vehicle 3 via the communication network 4 and the wireless base station 5. More specifically, the communication interface 11 passes, to the processor 14, data received from the vehicle 3, such as the suitability data, the collection target data, and the location information, via the wireless base station 5 and the communication network 4. The communication interface 11 also transmits the collection command received from the processor 14 and other signals to the vehicle 3 via the communication network 4 and the wireless base station 5.

The storage device 12, which is an example of a storing unit, includes, for example, a hard disk drive, or an optical recording medium and an access device therefor. The storage device 12 stores the type information, the collection target data that has been collected for each road section, and other data. The storage device 12 may further store the identification information of the vehicle 3. The storage device 12 may further store a computer program executed on the processor 14 for performing the data collecting process. The storage device 12 may further store the road map to be updated using the collection target data.

The memory 13, which is another example of the storing unit, includes, for example, nonvolatile and volatile semiconductor memories. The memory 13 temporarily stores varieties of data generated during execution of the data collecting process, and varieties of data acquired by communication with the vehicle 3, such as the suitability data.

The processor 14, which is an example of a control unit, includes one or more central processing units (CPUs) and a peripheral circuit thereof. The processor 14 may further include another arithmetic circuit, such as a logical operation unit or a numerical operation unit. The processor 14 performs the data collecting process.

FIG. 4 is a functional block diagram of the processor 14, related to the data collecting process. The processor 14 includes a determining unit 21 and an instructing unit 22. These units included in the processor 14 are, for example, functional modules implemented by a computer program executed on the processor 14, or may be dedicated arithmetic circuits provided in the processor 14.

Every time the server 2 receives the suitability data from the vehicle 3, the determining unit 21 determines whether the current state of the vehicle 3 is suitable for data collection, based on the suitability data. For example, in the case that the suitability data includes a visibility index, only when the visibility index indicates that a road or a road feature is clear in the image generated by the camera mounted on the vehicle 3, the determining unit 21 determines that the current state of the vehicle 3 is suitable for data collection. This prevents the vehicle 3 from transmitting, to the server 2, collection target data in which a feature to be represented on the road map is unrecognizable.

More specifically, when the visibility index is the current time corresponding to daytime, the determining unit 21 determines that the road or the road feature in the image is clear; when the visibility index is the current time corresponding to nighttime, the determining unit 21 determines that the road or the road feature is unclear. Alternatively, when the visibility index is the current time corresponding to sunrise or sunset and the vehicle 3 is traveling toward the sun, the determining unit 21 may determine that the road or the road feature in the image is clear. When the visibility index is control information on automatic lighting of the vehicle 3 and it indicates that the headlight of the vehicle 3 is turned off, the determining unit 21 determines that the road or the road feature in the image is clear; when the visibility index is the control information indicating that the headlight is turned on, the determining unit 21 determines that the road or the road feature is unclear. When the visibility index is a value sensed by a illuminance sensor mounted on the vehicle 3 and it is greater than a predetermined illuminance threshold, the determining unit 21 determines that the road or the road feature in the image is clear; when the visibility index is a value sensed by the illuminance sensor and it is equal to or smaller than the illuminance threshold, the determining unit 21 determines that the road or the road feature is unclear. When the visibility index is information on stains of the camera mounted on the vehicle 3 and when it indicates that the stains do not affect the image visibility, e.g., when the degree of blurring caused by the stains is less than a predetermined threshold, the determining unit 21 determines that the road or the road feature in the image is clear; when the visibility index is the stain information indicating that the stains affects the image visibility, the determining unit 21 determines that the road or the road feature is unclear. When the visibility index is an image visibility value satisfying a visibility condition of an image, the determining unit 21 determines that the road or the road feature in the image is clear; when the visibility index is an image visibility value that does not satisfy the visibility condition, the determining unit 21 determines that the road or the road feature is unclear. As will be described below in relation to details of the vehicle 3, an image visibility value that is the maximum contrast, variance or luminance greater than a predetermined threshold leads to the determination that the visibility condition is satisfied. An image visibility value that is the minimum luminance smaller than a predetermined threshold also leads to the determination that the visibility condition is satisfied.

In the case that the suitability data includes a rest index, only when the rest index indicates that the vehicle 3 is moving, the determining unit 21 determines that the current state of the vehicle 3 is suitable for data collection. This prevents the vehicle 3 from transmitting, to the server 2, pieces of collection target data representing the same feature. More specifically, when the rest index is the position of the shift lever of the vehicle 3 and it is neither parking nor neutral, the determining unit 21 determines that the vehicle 3 is moving; when the rest index is the shift-lever position and it is parking or neutral, the determining unit 21 determines that the vehicle 3 is at rest. When the rest index is the speed of the vehicle 3 greater than a predetermined speed threshold (e.g., 5 to 10 km/h), the determining unit 21 determines that the vehicle 3 is moving; when the rest index is the vehicle speed equal to or smaller than the speed threshold, the determining unit 21 determines that the vehicle 3 is at rest.

In the case that the suitability data includes a hidden index, only when the hidden index indicates that a feature near the vehicle 3 (e.g., a road marking, a signpost, or a signal light) is not hidden in the image, the determining unit 21 determines that the current state of the vehicle 3 is suitable for data collection. This prevents the vehicle 3 from transmitting, to the server 2, collection target data in which a feature that should be represented on the road map is not represented.

More specifically, when the hidden index is a setting value of the vehicle distance for the case that the vehicle 3 automatically cruises and when it is longer than a predetermined distance threshold (e.g., 50 to 100 m), the determining unit 21 determines that the feature near the vehicle 3 is not hidden; when the hidden index is a setting value of the vehicle distance equal to or shorter than the distance threshold, the determining unit 21 determines that the feature is hidden. When the hidden index is a measurement of the distance from the vehicle 3 to another object close thereto obtained by the range sensor mounted on the vehicle 3 and it is longer than a predetermined distance threshold, the determining unit 21 determines that the feature near the vehicle 3 is not hidden; when the hidden index is a measurement of the distance equal to or shorter than the distance threshold, the determining unit 21 determines that the feature is hidden.

In the case that the suitability data includes a location index, only when the location index indicates that the vehicle 3 is at a location suitable for data collection, the determining unit 21 determines that the current state of the vehicle 3 is suitable for data collection. More specifically, when the location index is information indicating the location of the vehicle 3 relative to a lane division line, e.g., when the information indicates that the vehicle 3 is not straddling a lane division line, the determining unit 21 determines that the current state of the vehicle 3 is suitable for data collection. This prevents the vehicle 3 from transmitting, to the server 2, collection target data representing a feature differently from a normal case (e.g., a case in which the vehicle 3 is traveling along a lane). When the location index is the absolute location of the vehicle 3 and it is included in a road section in the target region for data collection, the determining unit 21 may determine that the current state of the vehicle 3 is suitable for data collection.

The suitability data may include multiple visibility indices. In this case, only when every visibility index indicates that a road or a road feature is clearly represented in the image, the determining unit 21 may determine that the current state of the vehicle 3 is suitable for data collection. Similarly, the suitability data may include multiple rest indices. In this case, only when every rest index indicates that the vehicle 3 is moving, the determining unit 21 may determine that the current state of the vehicle 3 is suitable for data collection. Additionally, the suitability data may include multiple hidden indices. In this case, only when every hidden index indicates that a feature near the vehicle 3 is not hidden in the image, the determining unit 21 may determine that the current state of the vehicle 3 is suitable for data collection. Additionally, the suitability data may include two or more of the visibility index, the rest index, the hidden index, and the location index. In this case, only when each of the two or more indices indicates that the current state of the vehicle 3 is suitable for data collection, the determining unit 21 may determine that the current state of the vehicle 3 is suitable for data collection. When any of the two or more indices indicates that the current state of the vehicle 3 is unsuitable for data collection, the determining unit 21 may determine that the current state of the vehicle 3 is unsuitable for data collection.

The determining unit 21 notifies the instructing unit 22 of the result of determination whether the current state of the vehicle 3 is suitable for data collection.

In the case that the determining unit 21 has determined that the current state of the vehicle 3 is suitable for data collection, the instructing unit 22 generates a collection command to instruct the vehicle 3 to collect the collection target data. The instructing unit 22 transmits the generated collection command to the vehicle 3, which is identified using the identification information received with the suitability data, via the communication interface 11, the communication network 4, and the wireless base station 5.

The instructing unit 22 refers to the location of the vehicle 3, which is indicated by the vehicle location information received with the suitability data, and the type information to identify the type of collection target data designated for the road section including the location of the vehicle. The instructing unit 22 may incorporate information specifying the identified type of collection target data into the collection command. As described above, examples of the type of collection target data include an image that is generated by the camera mounted on the vehicle 3 and represents surroundings of the vehicle 3, a sub-image of a road surface cut out from the image, and feature information for identifying a feature represented in the image and on a map to be generated or updated. In the case that the type information is transmitted to the vehicle 3 beforehand, the instructing unit 22 need not incorporate the information specifying the type of collection target data into the collection command.

FIG. 5 is an operation flowchart of the data collecting process performed by the server 2. Every time receiving the suitability data from the vehicle 3, the processor 14 of the server 2 may perform the data collecting process in accordance with the following operation flowchart.

The determining unit 21 of the processor 14 determines whether the current state of the vehicle 3 is suitable for data collection, based on the suitability data (step S201). When the current state of the vehicle 3 is suitable for data collection (Yes in step S201), the instructing unit 22 of the processor 14 generates a collection command to instruct the vehicle 3 to collect the collection target data, and transmits the generated collection command to the vehicle 3 via the communication interface 11, the communication network 4, and the wireless base station 5 (step S202). Thereafter, the processor 14 stores the collection target data received by the server 2 from the vehicle 3 in the storage device 12. The processor 14 then terminates the data collecting process.

When the current state of the vehicle 3 is unsuitable for data collection (No in step S201), the processor 14 terminates the data collecting process without transmitting the collection command to the vehicle 3.

The following describes the vehicle 3. The system 1 may include multiple vehicles 3 as described above, but the following describes a single vehicle 3 because each vehicle 3 may include the same configuration and perform the same process in relation to the data collecting process.

Figure 6:
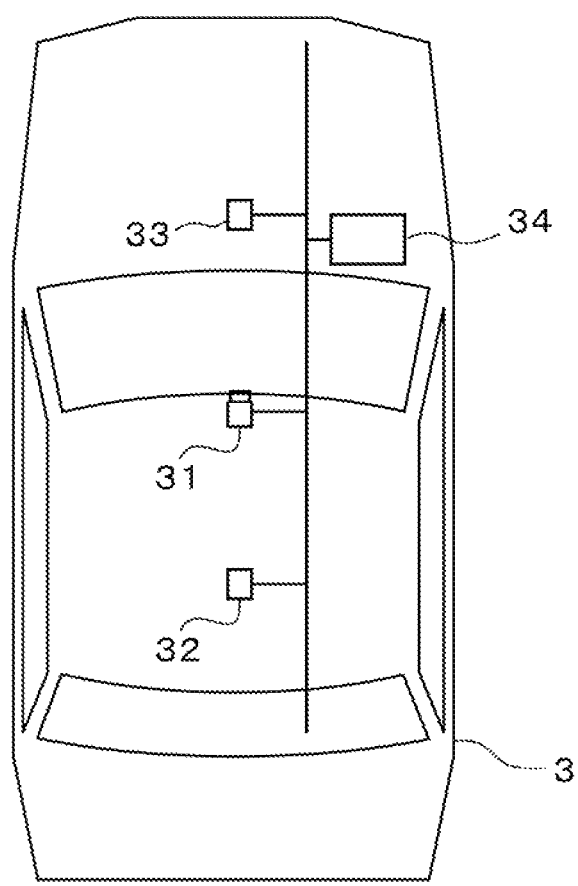
FIG. 6 schematically illustrates the configuration of a vehicle.

FIG. 6 schematically illustrates the configuration of the vehicle 3. The vehicle 3 includes a camera 31 for taking a picture of surroundings of the vehicle 3, a GPS receiver 32, a wireless communication terminal 33, and a data acquiring apparatus 34. The camera 31, the GPS receiver 32, the wireless communication terminal 33, and the data acquiring apparatus 34 are connected so that they can communicate via an in-vehicle network conforming to a standard, such as a controller area network. The vehicle 3 may further include a navigation device (not illustrated) for searching for a planned travel route of the vehicle 3 and for navigating so that the vehicle 3 may travel along the planned travel route. The vehicle 3 may further include a range sensor (not illustrated), such as a LiDAR sensor, for measuring the distance to an object near the vehicle 3.

The camera 31, which is an example of an imaging unit, includes a two-dimensional detector constructed from an array of optoelectronic transducers, such as CCD or C-MOS, having sensitivity to visible light and a focusing optical system focusing an image of a target region on the two-dimensional detector. The camera 31 is attached in such way that it is oriented in the front direction of the vehicle 3, for example, inside a vehicle interior of the vehicle 3. The camera 31 takes a picture of a region in front of the vehicle 3 every predetermined capturing period (e.g., 1/30 to 1/10 seconds), and generates images in which this region is captured. The images obtained by the camera 31 may be color or gray images. The vehicle 3 may include multiple cameras 31 taking pictures in different orientations or having different focal lengths.

Every time generating an image, the camera 31 outputs the generated image to the data acquiring apparatus 34 via the in-vehicle network.

The GPS receiver 32 receives a GPS signal from a GPS satellite every predetermined period, and determines the location of the vehicle 3, based on the received GPS signal. The GPS receiver 32 then outputs positioning information indicating the determination result of the location of the vehicle 3 obtained from the GPS signal to the data acquiring apparatus 34 via the in-vehicle network every predetermined period. The vehicle 3 may include a receiver conforming to another satellite positioning system other than the GPS receiver 32. In this case, the other receiver may determine the location of the vehicle 3.

The wireless communication terminal 33, which is an example of a communication unit, performs a wireless communication process conforming to a predetermined standard of wireless communication, and accesses, for example, the wireless base station 5 to connect to the server 2 via the wireless base station 5 and the communication network 4. The wireless communication terminal 33 receives a downlink radio signal including the type information or a collection command from the server 2, and outputs the type information or the collection command to the data acquiring apparatus 34. The wireless communication terminal 33 also generates an uplink radio signal including data received from the data acquiring apparatus 34, such as the suitability data, the vehicle location information, or collection target data of a designated type and location information indicating the location of a feature represented by the collection target data. The wireless communication terminal 33 then transmits the uplink radio signal to the wireless base station 5 to transmit the vehicle location information, the collection target data, the location information, and other data to the server 2.

Figure 7:
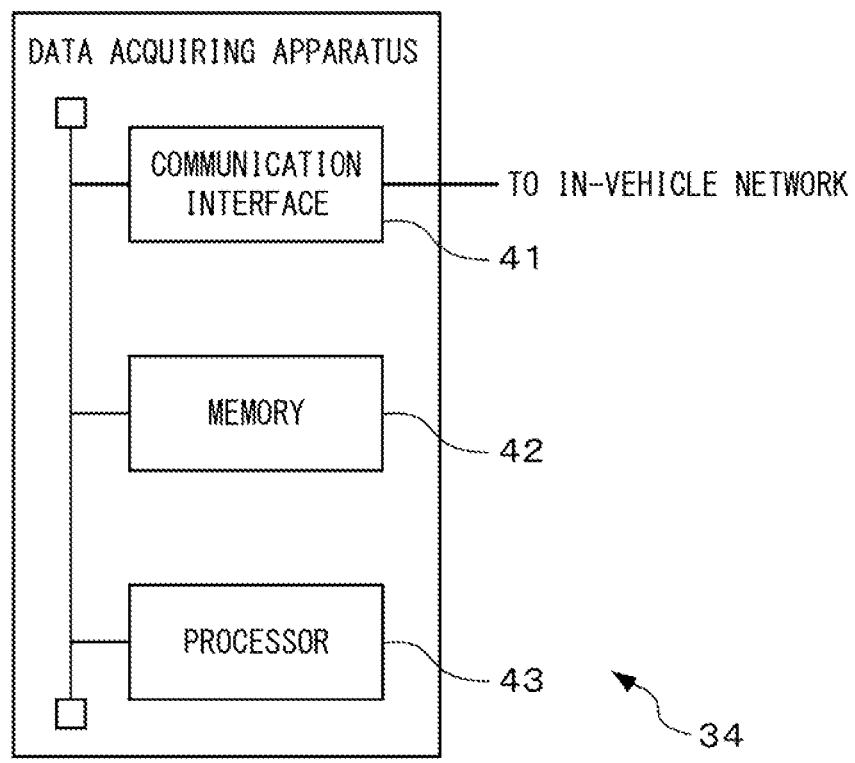
FIG. 7 illustrates the hardware configuration of a data acquiring apparatus.

FIG. 7 illustrates the hardware configuration of the data acquiring apparatus. The data acquiring apparatus 34 generates the suitability data. When receiving a collection command, the data acquiring apparatus 34 also generates collection target data, using an image generated by the camera 31. To this end, the data acquiring apparatus 34 includes a communication interface 41, a memory 42, and a processor 43.

The communication interface 41, which is an example of an in-vehicle communication unit, includes an interface circuit for connecting the data acquiring apparatus 34 to the in-vehicle network. In other words, the communication interface 41 is connected to the camera 31, the GPS receiver 32, and the wireless communication terminal 33 via the in-vehicle network. Every time receiving an image from the camera 31, the communication interface 41 passes the received image to the processor 43. Every time receiving positioning information from the GPS receiver 32, the communication interface 41 passes the received positioning information to the processor 43. Every time receiving information from the server 2, such as a collection command, from the wireless communication terminal 33, the communication interface 41 passes the received information to the processor 43. The communication interface 41 further outputs data received from the processor 43, such as the suitability data, the vehicle location information, the collection target data, and the location information, to the wireless communication terminal 33 via the in-vehicle network.

The memory 42, which is an example of a storing unit, includes, for example, volatile and nonvolatile semiconductor memories. The data acquiring apparatus 34 may further include another storing device, such as a hard disk drive. The memory 42 stores varieties of data used in a process related to collection of data for map generation performed by the processor 43 of the data acquiring apparatus 34, such as the identification information of the vehicle 3, internal parameters of the camera 31, images received from the camera 31, various parameters for specifying a classifier for detecting a feature from an image, and the positioning information received from the GPS receiver 32. The memory 42 may further store computer programs executed on the processor 43 for performing various processes.

The processor 43 includes one or more central processing units (CPUs) and a peripheral circuit thereof. The processor 43 may further include another arithmetic circuit, such as a logical operation unit, a numerical operation unit, or a graphics processing unit. The processor 43 stores, in the memory 42, the images received from the camera 31, the positioning information received from the GPS receiver 32, and other data. The processor 43 performs a process related to collection of data for map generation while the vehicle 3 is traveling.

FIG. 8 a functional block diagram of the processor 43 of the data acquiring apparatus 34. The processor 43 includes a suitability-data generating unit 51, a detecting unit 52, and a collection-data generating unit 53. These units included in the processor 43 are, for example, functional modules implemented by a computer program executed on the processor 43, or may be dedicated arithmetic circuits provided in the processor 43.

The suitability-data generating unit 51 generates the suitability data, for example, every predetermined period (e.g., 1 to 10 minutes) or every time the vehicle 3 travels a predetermined distance (e.g., 100 m to 1 km).

The suitability-data generating unit 51 incorporates, for example, at least one of the visibility index, the rest index, the hidden index, and the location index into the suitability data as described above. For example, when incorporating the current time into the suitability data as the visibility index, the suitability-data generating unit 51 may acquire information indicating the current time from a timepiece (not illustrated) mounted on the vehicle 3 or from time information received via the wireless communication terminal 33. When incorporating control information on automatic lighting of the vehicle 3 into the suitability data as the visibility index, the suitability-data generating unit 51 may acquire the control information via the in-vehicle network from an electronic control unit (not illustrated) controlling the headlight of the vehicle 3. Similarly, when incorporating a value sensed by a illuminance sensor (not illustrated) mounted on the vehicle 3 into the suitability data as the visibility index, the suitability-data generating unit 51 may acquire the sensed value via the in-vehicle network from the illuminance sensor or an electronic control unit (not illustrated) controlling a windshield wiper.

When incorporating information on stains of the camera 31 into the suitability data as the visibility index, the suitability-data generating unit 51 may obtain a value indicating the degree of blurring caused by the stains of the camera 31, for example, from an image generated by the camera 31. In this case, the suitability-data generating unit 51 calculates, for example, a statistically representative value of intensity of each edge detected by applying an edge detection filter to the image as the value indicating the degree of blurring. Alternatively, the suitability-data generating unit 51 may obtain a value indicating the degree of stains of the camera 31 in accordance with one of various methods for obtaining the degree of stains of a camera from an image. When incorporating an image visibility value of an image generated by the camera 31 into the suitability data as the visibility data, the suitability-data generating unit 51 may calculate the image visibility value from the image. For example, the suitability-data generating unit 51 calculates the contrast of a road region in the image (e.g., the ratio of the difference between the maximum and the minimum of luminances of the pixels in the region to the sum of the maximum and the minimum) as the image visibility value. Alternatively, the suitability-data generating unit 51 may calculate, for example, the minimum, maximum, or variance of luminances of the pixels of the image as the image visibility value. More specifically, a minimum luminance that is close to the upper limit of the luminance range (e.g., 0 to 255) indicates that the whole image is substantially white-filled and has low visibility. Similarly, a maximum luminance that is close to the lower limit of the luminance range indicates that the whole image is substantially black-filled and has low visibility. A low variance of luminances indicates that the whole image has substantially the same luminance and has low visibility.

When incorporating the position of the shift lever of the vehicle 3 into the suitability data as the rest index, the suitability-data generating unit 51 may acquire information indicating the shift-lever position via the in-vehicle network from an electronic control unit (not illustrated) controlling the travel of the vehicle 3. Similarly, when incorporating the speed of the vehicle 3 into the suitability data as the rest index, the suitability-data generating unit 51 may acquire a measurement of the vehicle speed via the in-vehicle network from a vehicle speed sensor (not illustrated) measuring the speed of the vehicle 3 or from the electronic control unit controlling the travel of the vehicle 3.

When incorporating a setting value of the vehicle distance for the case that the vehicle 3 automatically cruises into the suitability data as the hidden index, the suitability-data generating unit 51 may acquire the setting value via the in-vehicle network from the electronic control unit controlling the travel of the vehicle 3. Similarly, when incorporating a measurement of the distance from the vehicle 3 to another object close thereto into the suitability data as the hidden index, the suitability-data generating unit 51 may acquire the measurement of the distance via the in-vehicle network from the range sensor or from the electronic control unit controlling the travel of the vehicle 3.

When incorporating information indicating the location of the vehicle 3 relative to a lane division line into the suitability data as the location index, the suitability-data generating unit 51 detects the lane division line, for example, from an image acquired from the camera 31. The suitability-data generating unit 51 may determine whether the vehicle 3 is straddling the lane division line, based on the position of the lane division line on the image, and use a flag indicating the determination result as the location index. The suitability-data generating unit 51 can detect a lane division line, for example, by inputting the image into a classifier that has been trained to detect a feature, such as a lane division line, as will be described below in relation to the detecting unit 52. Since the orientation of the camera 31 relative to the traveling direction of the vehicle 3 is known, the area of the image that is supposed to represent a lane division line straddled by the vehicle 3 is also known. Thus, the suitability-data generating unit 51 can determine whether the vehicle 3 is straddling the lane division line by prestoring such an area in the memory 42 and determining whether this area includes the detected lane division line. When using the absolute location of the vehicle 3 as the location index, the suitability-data generating unit 51 may incorporate, for example, the vehicle location indicated by the latest positioning information received from the GPS receiver 32 into the suitability data.

When generating the suitability data, the suitability-data generating unit 51 outputs the generated suitability data together with the identification information and the vehicle location information of the vehicle 3 to the wireless communication terminal 33 via the communication interface 41. In this way, the suitability-data generating unit 51 transmits the identification information and the vehicle location information of the vehicle 3 and the suitability data to the server 2 via the wireless base station 5 and the communication network 4. The suitability-data generating unit 51 may incorporate the vehicle location indicated by the latest positioning information received from the GPS receiver 32 into the vehicle location information.

The suitability-data generating unit 51 further temporarily stores, in the memory 42, images received from the camera 31 after the generation of the suitability data. This allows for generating collection target data from images obtained in the period from when the suitability data is transmitted to the server 2 until a collection command is received.

When instructed by the server 2 to collect feature information as collection target data, the detecting unit 52 detects a predetermined feature from images generated by the camera 31 after the generation of the suitability data. The predetermined feature is, for example, a feature represented on the road map. The detecting unit 52 then generates location information indicating the kind and location of the feature detected in the images.

For example, the detecting unit 52 inputs an image into a classifier to detect a feature represented in the inputted image. As such a classifier, the detecting unit 52 may use, for example, a deep neural network (DNN) that has been trained to detect, from an inputted image, a feature represented in the image. As such a DNN, the detecting unit 52 may use, for example, a DNN having a convolutional neural network (CNN) architecture, such as a Single Shot MultiBox Detector (SSD) or a Faster R-CNN. In this case, when the detecting unit 52 inputs an image into a classifier, the classifier calculates, for each kind of feature to be detected (e.g., a lane division line, a pedestrian crossing, and a stop line), the probability that the feature is represented in a region of the inputted image. The classifier calculates this probability for each of various regions of the inputted image, and determines that the region where the probability for a certain kind of feature is greater than a predetermined detection threshold represents this kind of feature. The classifier then outputs information indicating the region including the feature to be detected in the inputted image, e.g., a circumscribed rectangle of the feature, which is referred to as an "object region" below; and information indicating the kind of feature represented in the object region.

Alternatively, the detecting unit 52 may use a classifier other than the DNN. For example, the detecting unit 52 may use, as the classifier, a support vector machine (SVM) that has been trained to output the probability that the feature to be detected is represented in a window defined on an image, in response to an input of a characteristic quantity, e.g., histograms of oriented gradients (HOG), calculated with respect to the window; The detecting unit 52 calculates the characteristic quantity with respect to a window defined on an image while variously changing the position, size, and aspect ratio of the window; and inputs the calculated quantity to the SVM to obtain the probability for the window; The detecting unit 52 then determines that the window for which the probability is greater than a predetermined detection threshold is an object region representing the feature to be detected.

The detecting unit 52 estimates the location of the feature represented in the object region detected from the image, based on the bearing of the location corresponding to the centroid of the object region with respect to the camera 31, the location and the traveling direction of the vehicle 3, and the internal parameters of the camera 31, such as its orientation and angle of view. The detecting unit 52 then outputs the kind of the detected feature and the estimated location thereof to the collection-data generating unit 53.

When receiving a collection command from the server 2, the collection-data generating unit 53 generates collection target data of the type designated by the collection command and location information indicating the location of the feature represented by the collection target data from images generated by the camera 31 after the generation of the suitability data. The collection-data generating unit 53 then outputs the generated collection target data and location information together with the identification information of the vehicle 3 to the wireless communication terminal 33 via the communication interface 41 to transmit the identification information of the vehicle 3, the collection target data, and the location information to the server 2 via the wireless base station 5 and the communication network 4.

In the case that the vehicle 3 has received the type information, the collection-data generating unit 53 may refer to the type information to identify the type of collection target data designated for the road section including the location of the vehicle 3. In this case, when the location of the vehicle 3 is included in a road section where collection is not required for any type of collection target data, the collection-data generating unit 53 need not generate the collection target data.

For example, when the designated type is a whole image, the collection-data generating unit 53 uses a road image itself obtained from the camera 31 as the collection target data. An image obtained by the camera 31 attached so as to take a picture of a region in front of the vehicle 3 is supposed to represent a road. When the designated type is a sub-image, the collection-data generating unit 53 cuts out an area that is supposed to represent a road surface from a road image obtained from the camera 31 to generate a sub-image, and uses it as the collection target data. Information indicating the area that is supposed to represent a road surface in an image may be prestored in the memory 42. The collection-data generating unit 53 may refer to this information to identify the area to be cut out from the image. When the designated type is feature information, the collection-data generating unit 53 uses the feature information received from the detecting unit 52 and including the kind of the detected feature as the collection target data.

The collection-data generating unit 53 incorporates the location of the vehicle 3 where the image used for generating the collection target data was captured into the location information as the location of the feature represented by the collection target data. Alternatively, when the type of collection target data is feature information, the collection-data generating unit 53 may incorporate the estimated location of the detected feature notified from the detecting unit 52 into the location information. Alternatively; when the type of collection target data is a whole image or a sub-image, the collection-data generating unit 53 may estimate the location corresponding to the center of the whole image or the sub-image, based on the bearing of the location corresponding to the image center with respect to the camera 31, the location and the traveling direction of the vehicle 3, and the internal parameters of the camera 31, such as its orientation and angle of view. Then, the collection-data generating unit 53 may incorporate the estimated location into the location information as the location of the feature represented by the collection target data.

To receive the type information beforehand, the processor 43 may notify the server 2 of the current location of the vehicle 3 at predetermined timing. For example, when receiving a signal indicating that the ignition switch of the vehicle 3 is turned on via the communication interface 41 from the electronic control unit (not illustrated) controlling the travel of the vehicle 3, the processor 43 generates vehicle location information including the location of the vehicle 3 indicated by the positioning information received from the GPS receiver 32 via the communication interface 41. The processor 14 then outputs the vehicle location information together with the identification information of the vehicle 3 to the wireless communication terminal 33 via the communication interface 41 to transmit the vehicle location information and the identification information of the vehicle 3 to the server 2 via the wireless base station 5 and the communication network 4.

FIG. 9 is an operation flowchart of a process performed by the vehicle 3 in the data collecting process. For example, every predetermined period or every time the vehicle 3 travels a predetermined distance, the processor 43 of the data acquiring apparatus 34 may perform the related process in the data collecting process in accordance with the following operation flowchart.

The suitability-data generating unit 51 of the processor 43 generates suitability data, and transmits the generated suitability data together with the identification information and the vehicle location information of the vehicle 3 to the server 2 via the wireless communication terminal 33, the wireless base station 5, and the communication network 4 (step S301).

The collection-data generating unit 53 of the processor 43 determines whether a collection command is received in a predetermined period from the transmission of the suitability data from the server 2 via the communication network 4, the wireless base station 5, and the wireless communication terminal 33 (step S302). In the case that a collection command is received in the predetermined period (Yes in step S302), the collection-data generating unit 53 generates collection target data of a designated type. When the designated type of collection target data includes feature information, the collection-data generating unit 53 incorporates the feature information obtained by the detecting unit 52 of the processor 43 from an image acquired from the camera 31 into the collection target data. The collection-data generating unit 53 then transmits the generated collection target data together with the identification information and the location information of the vehicle 3 to the server 2 via the wireless communication terminal 33, the wireless base station 5, and the communication network 4 (step S303). The processor 43 then terminates the related process in the data collecting process.

In the case that a collection command is not received in the predetermined period (No in step S302), the processor 43 terminates the related process in the data collecting process without generating collection target data.

As has been described above, the data collecting apparatus determines whether the current state of the vehicle is suitable for data collection, based on the suitability data, and, when determining that the current state of the vehicle is suitable for data collection, instructs the vehicle to collect the collection target data. The vehicle having received such an instruction generates collection target data and transmits the generated collection target data to the data collecting apparatus. In this way, the data collecting apparatus determines beforehand whether collection target data suitable for map generation can be obtained, and, when such data is supposed to be obtained, instructs the vehicle to collect the collection target data, which prevents the vehicle from transmitting collection target data unsuitable for map generation to the apparatus. The data collecting apparatus thus stores a smaller amount of collection target data, reducing the hardware cost of the apparatus and the man-hours for classifying the collection target data as well as the communication load between the vehicle and the apparatus.

According to a modified example, the processor 43 of the data acquiring apparatus 34 of the vehicle 3 may perform the process of the determining unit 21 of the processor 14 of the server 2, based on the generated suitability data, and the processes of the detecting unit 52 and the collection-data generating unit 53 in accordance with the determination result in the process of the determining unit 21. In this case, the instructing unit 22 of the processor 14 of the server 2 may be omitted. According to this modified example, the vehicle 3 need not transmit the suitability data to the server 2, which further reduces the communication load between the server 2 and the vehicle 3.

As described above, those skilled in the art may make various modifications according to embodiments within the scope of the present invention.

What is claimed is:

1. A method for collecting data for map generation, comprising:
   determining whether a current state of a vehicle is suitable for collection of collection target data to be used for generating or updating a map, based on suitability data received from the vehicle using a communication device, the suitability data indicating suitability of the vehicle or surroundings thereof for the collection, wherein the suitability data includes a visibility index indicating a visibility of a road or a road feature, the visibility index being generated based on data obtained by an illuminance sensor and a camera for generating an image of the surroundings of the vehicle;
   transmitting to the vehicle, before transmitting a collection command, a type of collection target data to be collected for a target region, wherein the type of the collection target data comprises whole image data and sub-image data, and based on the type of the collection target data being sub-image data, an area representing a road surface is extracted from a road image;
   based on the collection target data being the whole image data, identifying a location of a center of a whole-image or a center of a sub-image, based on a bearing of a location corresponding to an image center with respect to the camera, a location and traveling direction of the vehicle, and internal parameters of the camera, and identifying a location of a feature based on the location of the center of the whole-image or the sub-image;
   transmitting, using the communication device, after determining that the current state of the vehicle is suitable for the collection, the collection command instructing the vehicle to collect the collection target data corresponding to the type of the collection target data to be collected for the target region; and
   based on the collection target data, controlling travel of the vehicle using newly generated map information.

2. The method of claim 1, wherein the type of the collection target data to be collected for the target region includes the type of the collection target data for each road section of the road included in the target region.

3. The method of claim 1, wherein the type of the collection target data to be collected for the target region includes the type of the collection target data for each road section of the road included in the target region.

4. The method according to claim 1, wherein the suitability data includes at least one index selected from a group consisting of a hidden index indicating whether the feature near the vehicle is hidden in the image by another object, a rest index indicating whether the vehicle is at rest, and a location index indicating a location of a vehicle.

5. The method according to claim 4, wherein the suitability data includes the visibility index, and the method further comprises determining, only when the visibility index indicates that the road or the road feature is clear in the image, that the current state of the vehicle is suitable for the collection.

6. The method according to claim 4, wherein the suitability data includes the hidden index, and further comprises: determining, only when the hidden index indicates that the feature near the vehicle is not hidden in the image by another object, that the current state of the vehicle is suitable for the collection.

7. The method according to claim 4, wherein the suitability data includes the rest index, and further comprises: determining, only when the rest index indicates that the vehicle is moving, that the current state of the vehicle is suitable for the collection.

8. The method according to claim 4, wherein the suitability data includes the location index, and further comprises: determining, only when the location index indicates that the vehicle is not straddling a lane division line, that the current state of the vehicle is suitable for the collection.

\* \* \* \* \*